United States Patent

Grafton et al.

[15] 3,646,928
[45] Mar. 7, 1972

[54] PORTABLE GAS-FIRED COOKING GRILL

[72] Inventors: Jim R. Grafton, Moline, Ill.; Glenn E. Wilkins, Davenport, Iowa; Joseph F. Murphy, Moline, Ill.

[73] Assignee: Blackhawk Metal Products, Inc., Davenport, Iowa

[22] Filed: Sept. 23, 1970

[21] Appl. No.: 74,747

[52] U.S. Cl. ..........................126/41 R, 126/25 R, 126/38
[51] Int. Cl. .....................A47j 37/00, F24b 3/00, F24c 3/14
[58] Field of Search ........................................126/41, 38, 25

[56] References Cited

UNITED STATES PATENTS

| 3,298,361 | 1/1967 | Clark | 126/25 |
| 3,500,812 | 3/1970 | Korngold | 126/25 |
| 2,861,562 | 11/1968 | Ross et al. | 126/38 |
| 3,474,724 | 10/1969 | Jenn | 126/41 X |
| 2,898,846 | 8/1959 | Del Francia | 126/41 X |
| 3,332,339 | 7/1967 | Helgeson et al. | 126/41 X |

Primary Examiner—Charles J. Myhre
Attorney—John M. Nolan

[57] ABSTRACT

A portable gas-fired cooking grill includes a portable, closable case formed by similar, opposite, top and bottom members hinged together along one edge, with a handle opposite the hinged edge. A gas burner is mounted in the bottom of the bottom member and removably connectable to a propane fuel supply. A grill spans the open top of the bottom member, and a plurality of ceramic briquettes are attached to the underside of the grill in a regular pattern above the gas burner.

17 Claims, 8 Drawing Figures

INVENTORS
J. R. GRAFTON
G. E. WILKINS
J. F. MURPHY

INVENTORS
J. R. GRAFTON
G. E. WILKINS
J. F. MURPHY

INVENTORS
J. R. GRAFTON
G. E. WILKINS
J. F. MURPHY

3,646,928

PORTABLE GAS-FIRED COOKING GRILL

BACKGROUND OF THE INVENTION

This invention relates to a cooking apparatus, and more particularly to a gas-fired barbecue grill of the type utilizing ceramic elements heated by a gas burner as a source of cooking heat.

This type of barbecue grill has achieved widespread commercial acceptance, since it has eliminated the inconvenience and delay associated with lighting a charcoal-type grill, while reducing the fuel cost, since gas is considerably cheaper than charcoal. Another advantage of the gas-fired grills resides in the fact that the heat can be adjusted during the cooking operation by simply adjusting the gas flow to the burners. By heating the ceramic elements, which in turn supply heat to the food, the cooking effect on the food, and consequently the flavor of the food, is substantially the same as the more traditional method of cooking with charcoal.

Heretofore, gas-fired grills of this type have been permanently mounted on pedestals, with the gas supply being delivered to the burner in the bottom of the cooking unit upwardly through the pedestal. Thus, this type of grill has not been utilized as a portable barbecue grill, the portable grills generally being of the charcoal type.

Also, the ceramic elements, which have either been in the shape of briquettes or shaped like stones having approximately 1-3 inch diameters, have been loosely arranged on a grid above the burner. The resulting uneven distribution has produced uneven cooking temperatures in different areas of the grill, which, of course, is undesirable. Also, spaces could appear between the adjacent elements that would permit grease to fall directly on the gas burners below the ceramic elements, increasing the possibility of grease fires in the grill.

SUMMARY OF THE INVENTION

According to the present invention, there is provided an improved gas-fired cooking grill of the type utilizing heated ceramic elements as a source of cooking heat. More specifically, there is provided a portable grill of said type, having particular utility for use on boats or by campers, or apartment dwellers, wherein a permanent installation of the conventional type of gas-fired grill is impossible or impractical.

An important feature of the invention resides in its compact configuration, which lends itself to portability, the grill having a small suitcase-like configuration with a handle on one side to facilitate the carrying of the grill.

Another feature of the invention resides in the use of fixed ceramic elements, to provide an even heat distribution and to eliminate the possibility of drippings passing directly through spaces between the elements onto the burners. The fixed arrangement of the ceramic elements also prevents the elements from bunching along one side of the grill during the transport of the grill.

Still another feature of the invention resides in the unique suspension of the ceramic elements beneath the cooking grid or grill.

The invention also features a compact and economical construction of the individual components as well as of the overall grill.

DESCRIPTION OF THE PREFERRED EMBODIMENT

The invention is embodied in a portable grill having a closable case or grill housing, indicated in its entirety by the numeral 10. As is apparent, the housing is generally rectangular, and is somewhat similar in appearance to a relatively small suitcase, the preferred size of the housing being approximately that of a relatively thick attache case or the like, so that the grill is easily transported.

Figure 5:
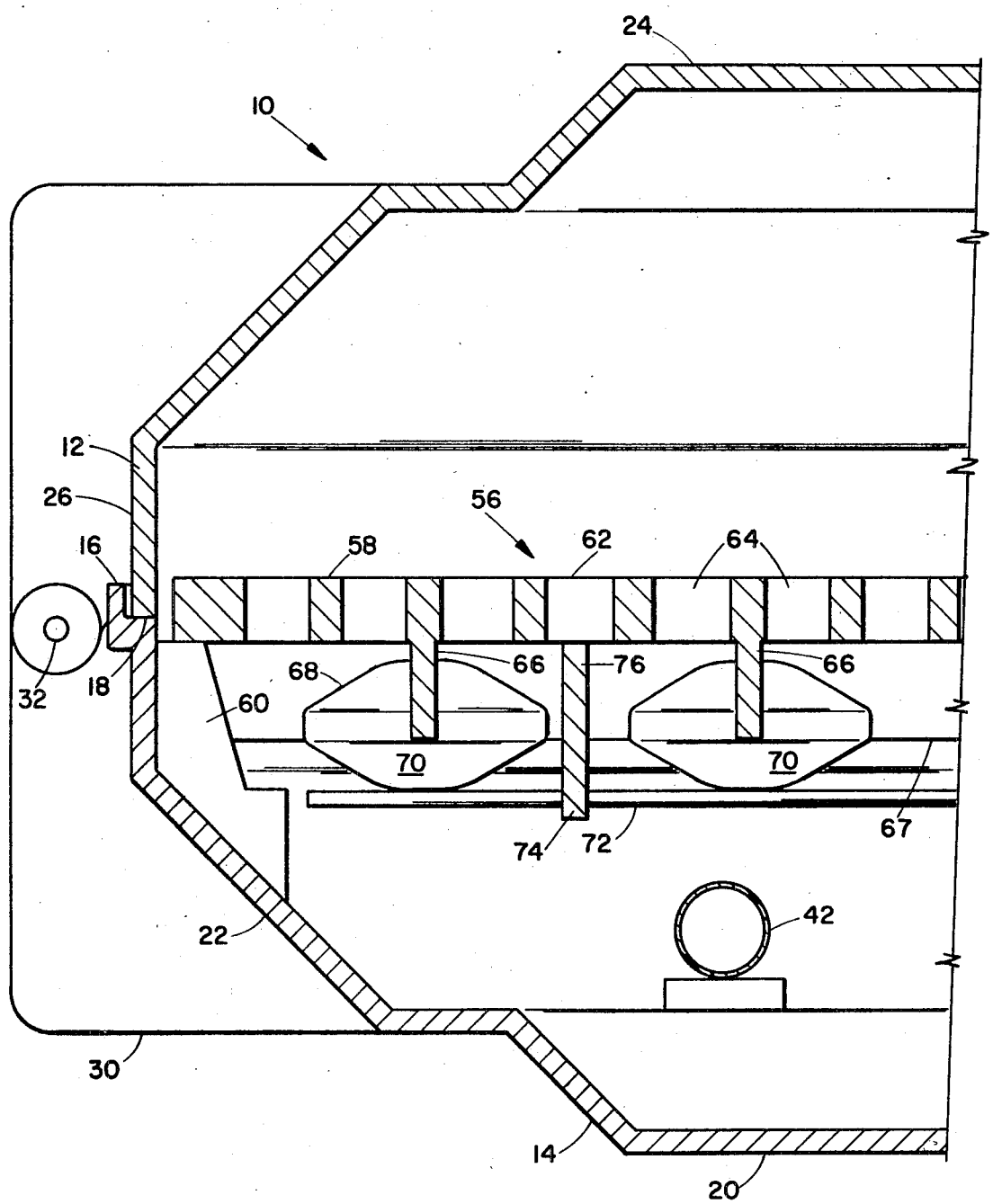
FIG. 5 is an enlarged partial section of the grill as viewed generally along the line 5—5 of FIG. 2.
Figure 6:
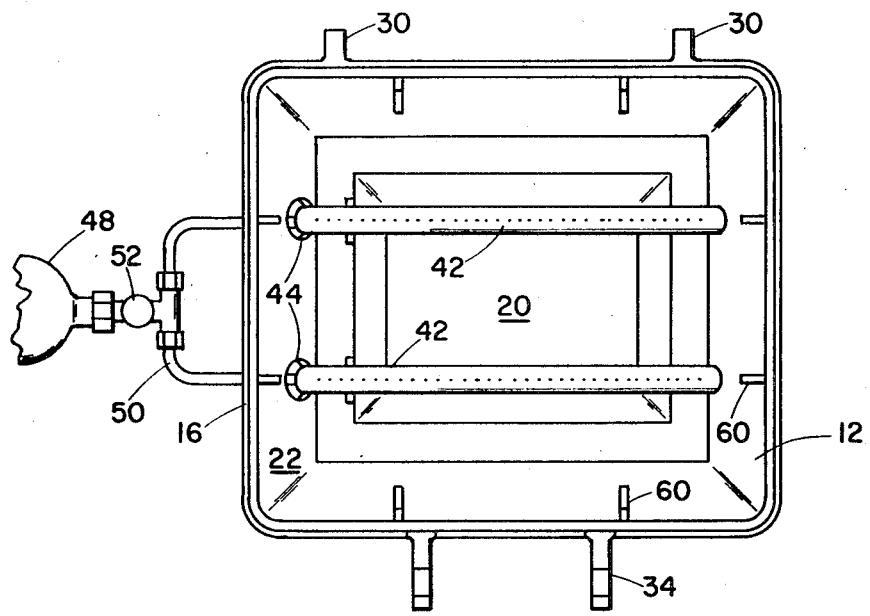
FIG. 6 is a plan view of the bottom part of the grill with the cooking grid removed to expose the burners.
Figure 7:
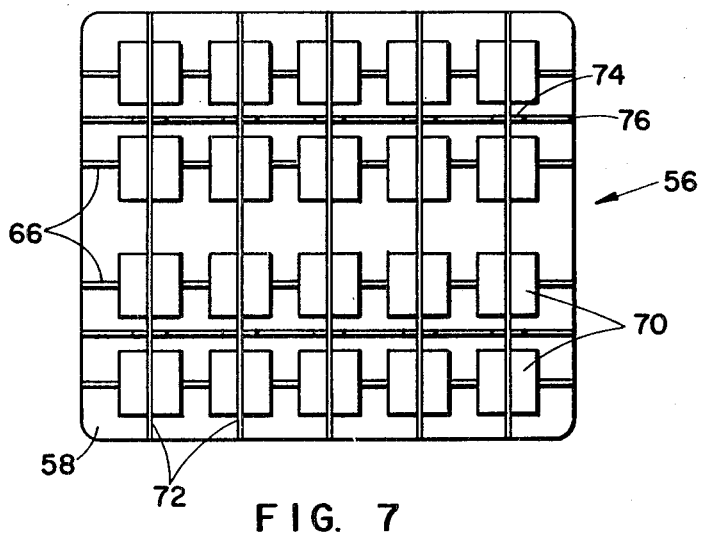
FIG. 7 is a bottom view of the cooking grid showing the arrangement of the ceramic cooking elements.
Figure 8:
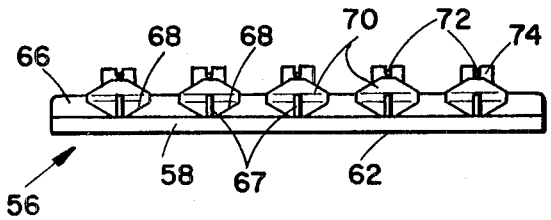
FIG. 8 is an end view of the grid shown in FIG. 7.

The housing is formed by a hollow bottom member or receptacle 12, which is horizontally disposed and open upwardly during operation of the grill, and a similar hollow cover or top member 14, which has an open bottom conforming to the open top of the receptacle 12, the open bottom of the cover 14 mating with the open top of the receptacle 12 to form a closed housing when the housing is in its closed condition as shown in FIGS. 1, 2, 3, and 5. The receptacle 12 is provided with a flared upper peripheral edge 16 to form a peripheral recess which receives the lower peripheral edge 18 of the cover 14, as best seen in FIG. 5.

The receptacle has a flat bottom 20 on which it rests during operation of the grill and generally tapered sidewalls 22 having an intermediate step and terminating in the flared upper edge 16. Similarly, the cover has a flat top 24 and generally tapered sidewalls 26 with a single intermediate step and terminating in the lower edge 18. The sidewalls 22 of the receptacle 12 and the sidewalls 26 of the cover 14 are provided with a plurality of vent holes 28, which are spaced around the entire receptacle and cover adjacent the cover top 24 and the receptacle bottom 20, the number and size of the vent holes being selected to give the proper amount of ventilation for cooking on the grill with the housing in the closed position.

Figure 1:
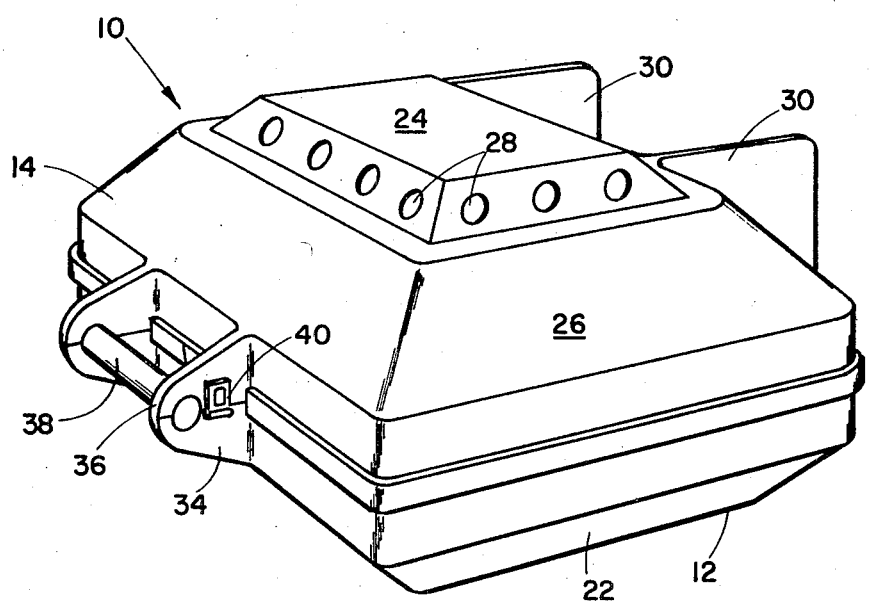
FIG. 1 is a perspective view of the grill in its closed condition.
Figure 2:
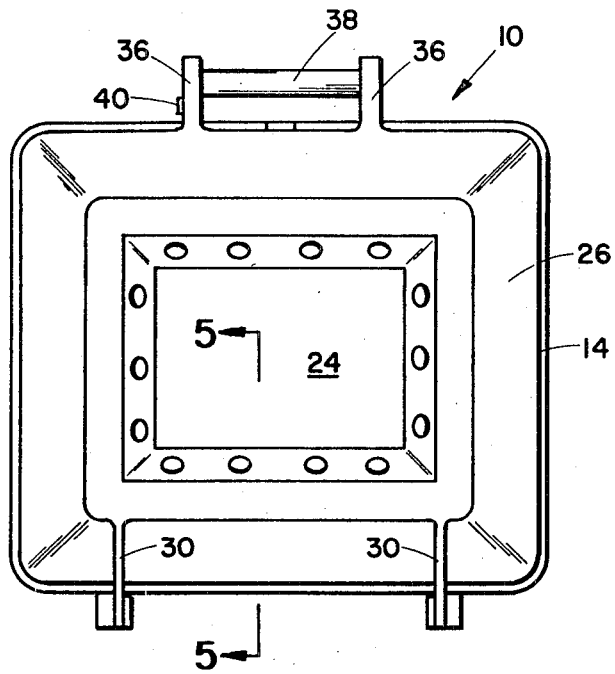
FIG. 2 is a plan view of the top of the grill.
Figure 3:
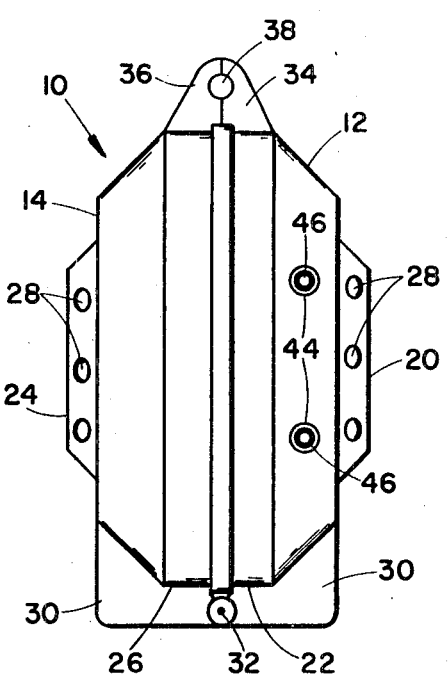
FIG. 3 is a side view of the grill.
Figure 4:
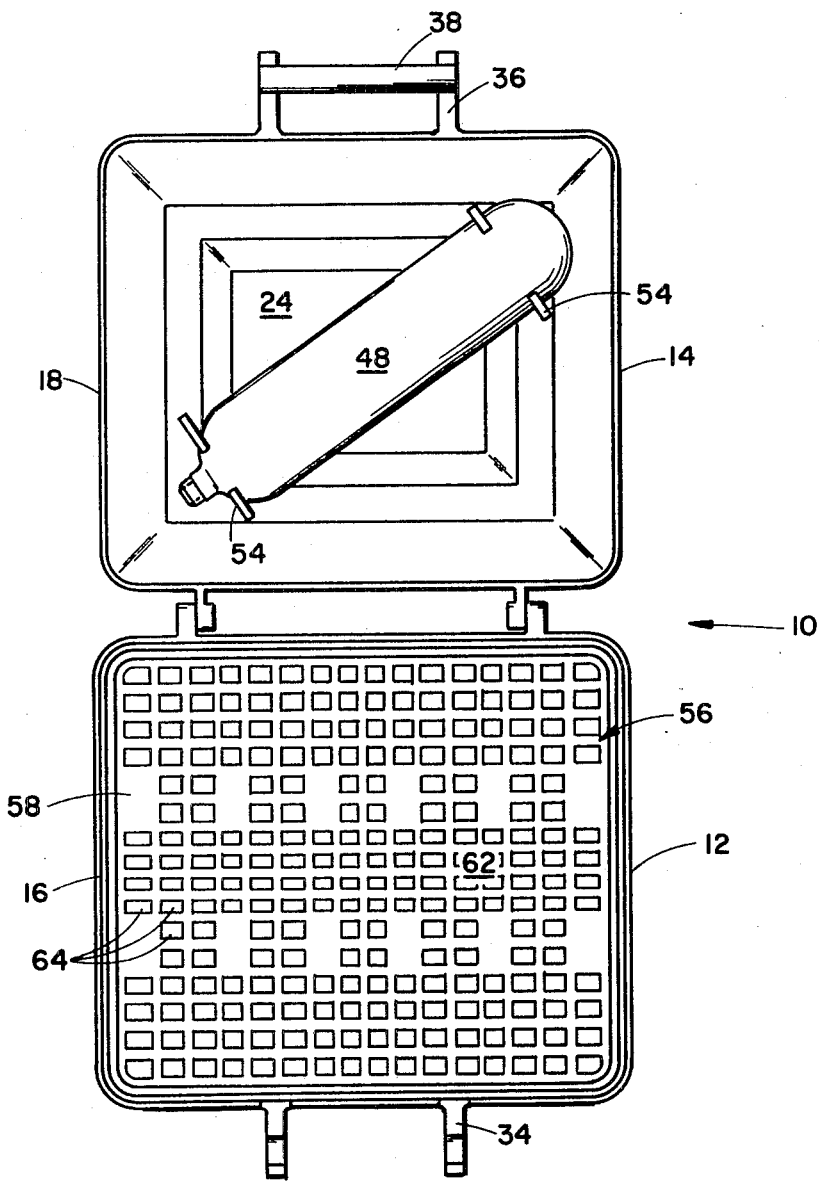
FIG. 4 is a top plan view of the grill with the cover swung back to its open position, showing a top plan view of the cooking grid over the bottom half of the grill.

Both the receptacle 12 and the cover 14 are provided with a pair of rearwardly extending flanges 30 which overlap at the juncture of the cover and receptacle and are respectively joined by transverse, aligned hinge pins 32, which permit the swinging of the cover 14 about the axis of the pins 32 from its closed position to its open position as shown in FIG. 4. The receptacle 12 and the cover 14 are also each provided with a pair of forwardly extending, transversely spaced flanges 34 and 36 respectively, the flanges 34 being respectively aligned with and abutting the flanges 36 when the housing is in its closed condition. The flanges 34 and 36 are provided with opposite semicircular recesses, which form a pair of transversely aligned circular bores when the housing is closed, the circular bores receiving and supporting the opposite ends of a cylindrical handle 38, which is affixed to the recesses in the flanges 36 but removable from the recesses in the flanges 34, so that the handle 38 normally serves only as a handle for the cover 14. A latch 40 is provided to releasably lock the flanges 34 and 36 to one another so that the housing can be locked in its closed condition, at which time the handle 38 functions as a carrying handle for the entire grill.

A pair of parallel, tubular burners are mounted in and transversely span the receptacle 12. As is apparent, the burners have a large number of small upwardly facing gas jets along their length and are supported above the shelf in the sidewalls 22. A pair of holes 44 are provided in one of the lateral sidewalls 22 and the open ends 46 of the burners 42 extend laterally through the holes 44, the opposite ends of the burners being closed and resting adjacent the opposite sidewall. The ends 46 of the burners are removably connectable to a propane gas tank 48 by means of a conventional releasable coupling system 50, here shown as a pair of flexible tubes, each tube having one end connected to a T-type of fitting and its other end removably connectable to a burner end 46 by means of a conventional fitting, such as a threaded coupling or a bayonet-type fitting. The other end of the T-type fitting is connectable to the propane tank 48 through a conventional valve 52, which is here schematically shown as being associated with the T-type fitting. As is apparent, the valve 52 permits the operator to control the flow rate of gas to the burners 42. The propane tank is of the type that is easily replaceable and commercially available at a relatively inexpensive price, and the tank can be stored within the cover 14 when the grill is not in use as best seen in FIG. 4, the tank being retained by a pair of spring-type clamps 54 depending from the top of the cover 14.

Mounted in the receptacle or bottom housing member 12 is a grill or grid member, indicated in its entirety by the numeral 56. The grill or grid member 56 has an upper or food-supporting portion 58, which substantially conforms to the shape of the open top of the receptacle 12, so that the food-supporting portion 58 substantially covers the entire open top of the receptacle 12. The food-supporting or upper portion 58 of the grid member 56 is relatively thick and rigid and is supported along its edges on a plurality of bosses 60 extending from the sidewalls 22 of the receptacle 12. As is apparent, the top surface 62 of the food-supporting portion of the grid member is substantially flush with the upper edge 16 of the receptacle 12.

The entire grid member 56 is preferably made of cast aluminum, and the upper or food-supporting portion 58 is provided with a large number of vertical apertures or holes 64, which cover most of the area of the food-supporting portion 58 and are arranged in a regular repeating pattern, only a portion of the pattern being shown in FIG. 5.

Depending from the lower side of the upper portion 58 of the grid member 56 are four laterally extending, elongated bosses 66, which span the width of the grid member and are approximately evenly spaced in a fore-and-aft direction. Similarly, five fore-and-aft extending bosses 67 also depend from the bottom of the upper portion of the grid member at right angles to the bosses 66, the bosses 67 also spanning the fore-and-aft dimension of the grid member and being approximately evenly spaced laterally. The bosses 66 and 67 are cast integrally with the rest of the grid member, and at the juncture of each lateral boss 66 with a fore-and-aft boss 67 there is provided an indentation or recess 68 in the bosses. Mounted within each recess 68 is a ceramic element capable of absorbing heat from the burners 42 and radiating the heat upwardly through the apertures 64 in the food-supporting or upper portion 58 of the grid member. Preferably, the ceramic elements are in the shape of conventional charcoal briquettes, such ceramic briquettes now being commercially available. As is apparent, the briquettes are generally rectangular and have a somewhat rounded cross section, and the recesses 68 formed in the bosses 66 and 67 have a shape conforming to the upper half of the briquettes. The ceramic briquettes are retained within the recesses by fore-and-aft extending rods 72, which respectively span the fore-and-aft length of the grid member 56 above the fore-and-aft bosses 67 and engage the bottom of the ceramic elements 70 to hold them firmly within the recesses 68. Each rod 72 is rigidly supported in a pair of spaced support bosses 74, which extend downwardly from a pair of transversely extending bosses 76 integrally depending from the bottom of the upper grid portion 58 parallel to the lateral bosses 67. The bottoms of the support bosses 74 are preferably provided with slots which receive the rods 72, after which the slots are peened together to rigidly retain the rods in the supports 74.

Thus, in the illustrated embodiment, 20 ceramic elements 70 are rigidly affixed to the underside of the grid member 56 in a somewhat regular pattern, the ceramic elements being relatively closely spaced. It is to be noted that the inner two laterally extending rows of ceramic elements have a slightly greater spacing and are generally directly above the burners 42. The food-supporting or upper portion 58 of the grid member 56 is provided with holes 64 only directly over the ceramic elements in the area above the burners 42, so that grease dripping through the holes 64 will not fall directly on the burners 42, to clog the jets or increase the possibility of a grease fire.

As is apparent, the grill can be easily carried, and, even during transport of the grill, the ceramic elements will remain fixed in their predetermined disposition, reducing the possibility of breakage of the elements and eliminating an uneven distribution of the elements, so that the elements will provide a relatively even heat. As is also apparent, it is quite simple to operate the grill, since it can be transported to any desired location and placed with its bottom 20 on any flat supporting surface. The cover 14 is then unlatched and raised, so that the propane tank 48 can be removed from the cover and connected to the burner 42 with the coupling system 50. The valve 52 is then turned on to provide the desired amount of gas and after a short warmup period, the grill is ready for cooking.

What is claimed is:

1. A portable, gas-fired cooking grill comprising: a receptacle adapted to be removably supported in a horizontal position and having an open top; a cover adapted to fit over the open top of the receptacle to form a portable substantially closed housing; a gas burner means mounted in a lower portion of said receptacle and having means for connecting the burner means to a fuel supply; a cooking grid mounted in the receptacle above the burner means; a plurality of substantially identical ceramic briquettes; and means for fixedly supporting said briquettes between the burner means and the cooking grid in a predetermined pattern.

2. The invention defined in claim 1 wherein the cover is generally hollow and has an open end substantially conforming to the open top of the receptacle, and including hinge means connecting the cover to the receptacle whereby the cover is swingable between an open position and a closed position wherein its open end mates with the open top of the receptacle to form said substantially closed housing.

3. The invention defined in claim 2 and including locking means for releasably locking the cover in its closed position.

4. The invention defined in claim 3 and including handle means attached to and extending outwardly from the cover adjacent the open end of the cover opposite the hinge means.

5. The invention defined in claim 4 wherein the fuel supply comprises a propane tank and the cover means includes means for removably securing the propane tank within the cover, the means for connecting the burner means to the fuel supply including a disconnectable coupling.

6. The invention defined in claim 2 wherein the receptacle has a flat bottom surface parallel to the open top and adapted to support the grill in a horizontal position.

7. The invention defined in claim 6 wherein the receptacle includes a plurality of sidewalls, one of said sidewalls including at least one opening; and tubing means removably connectable to the burner means and extending through said opening, the opposite end of said tubing means being connected to a portable gas supply having associated control valve means for selectively controlling the flow of gas from the gas supply through the tubing means to the burner.

8. The invention defined in claim 1 wherein the supporting means for said ceramic elements are associated with the cooking grid whereby the elements are suspended from the bottom of the cooking grid.

9. The invention defined in claim 8 wherein the cooking grid is provided with a large number of apertures and the burner means are disposed directly below some of said apertures, and at least some of the ceramic elements are interposed directly between the burner means and all the apertures directly thereabove.

10. A gas-fired cooking grill comprising: a receptacle having an open top; a gas burner means mounted in a lower portion of said receptacle; a horizontal cooking grid mounted in the receptacle above the burner means and spanning the open top of the receptacle; a plurality of ceramic briquettes; and means attached to the grid for fixedly mounting the briquettes in a predetermined pattern within the receptacle between the burner means and the cooking grid.

11. The invention defined in claim 10 wherein the cooking grid is made of cast metal and includes a plurality of depending bosses having recesses adapted to receive the briquettes and the mounting means includes retainer means for holding the briquettes in said recesses.

12. A portable, gas-fired cooking grill comprising: a receptacle having an open top and flat bottom surface generally parallel to the top for removably supporting the receptacle in horizontal condition; a generally hollow cover having an open bottom conforming to and mateable with the open top of the receptacle to form a hollow substantially closed housing and movable therefrom to expose the open top of the receptacle; a gas burner means mounted in a lower portion of said receptacle; a flat cooking grid spanning the open top of the receptacle above the burner means; a plurality of noncombustible, heat absorbing and radiating elements; and means for fixedly supporting said elements in a predetermined pattern in the receptacle between the burner means and the cooking grid.

13. A portable, gas-fired cooking grill comprising: a receptacle having an open top and flat bottom surface generally parallel to the top for removably supporting the receptacle in horizontal condition; a generally hollow cover having an open bottom conforming to and mateable with the open top of the receptacle to form a hollow substantially closed housing and movable therefrom to expose the open top of the receptacle; a gas burner means mounted in a lower portion of said receptacle; a portable gas supply removably connectable to the burner means for supplying gas thereto; a flat cooking grid spanning the open top of the receptacle above the burner means; a plurality of noncombustible, heat absorbing and radiating elements; and means for fixedly supporting said elements in the receptacle in a predetermined pattern between the burner means and the cooking grid.

14. The invention defined in claim 13 and including hinge means swingably connecting the cover to the receptacle for swinging of the cover between a closed position wherein the open cover bottom mates with the open receptacle top and an open position wherein the cover is supported adjacent to the receptacle with the open cover bottom facing upwardly substantially in the same plane as the receptacle top.

15. A portable, gas-fired cooking grill comprising: a receptacle having an open top, sidewalls and a flat bottom surface generally parallel to the top for supporting the receptacle with the top in a horizontal condition; a cover having a top, sidewalls and an open bottom conforming to the receptacle top, the cover being movable into a closed position wherein the cover bottom mates with the receptacle top to form a hollow substantially closed housing; a first pair of flanges projecting outwardly from one of the sidewalls of the receptacles and a second pair of flanges projecting outwardly from one of the sidewalls of the cover and being respectively disposed adjacent to the first pair of flanges when the cover is in its closed position, the first and second flanges having edges forming a plane normal to the bottom surface of the receptacle when the cover is in its closed position so that the housing is supportable in a vertical condition on said edges; hinge means operatively connecting the first and second flanges so that the cover is swingable relative to the receptacle between said closed position and an open position; handle means mounted on a sidewall opposite the hinge means to permit manual transport of the housing in said vertical condition; locking means for releasably locking the cover to the receptacle in the closed position; a gas burner means mounted in a lower portion of the receptacle; a cooking grid spanning the open top of the receptacle above the burner means; and a plurality of noncombustible, heat absorbing and radiating elements supported in the receptacle between the cooking grid and the burner means.

16. A portable, gas-fired cooking grill comprising: a portable housing including a hollow bottom member having an open top, a bottom and sidewalls, one of said walls having at least one hole, and a cover member removably mounted over the open top of the bottom member to form a substantially closed housing; handle means attached to at least one of said members; a cooking grid spanning the open top of the bottom member; a gas burner means disposed within said bottom member below the cooking grid; a portable flammable gas supply; a valve means operatively associated with the gas supply to control the exhaust of gas therefrom; a connecting means extending through the hole in the sidewall and operative to removably connect the valve means to the burner means to deliver gas thereto; a plurality of noncombustible, heat absorbing and radiating elements; and means fixedly supporting the elements in a predetermined pattern between the burner means and the cooking grid and adapted to absorb heat from the burner means and radiate heat to the cooking grid.

17. The invention defined in claim 16 wherein the cover member is hollow and forms a recess above the cooking grid when the cover member is mounted over the top of the bottom member, and the potable gas supply comprises a propane tank storable in said recess.

* * * * *